US009124767B2

(12) United States Patent
Barrett et al.

(10) Patent No.: US 9,124,767 B2
(45) Date of Patent: Sep. 1, 2015

(54) MULTI-DVR MEDIA CONTENT ARBITRATION

(75) Inventors: Peter T. Barrett, Palo Alto, CA (US); Chris Yerga, Palo Alto, CA (US); David Clancy, Berkeley, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1365 days.

(21) Appl. No.: 11/552,773

(22) Filed: Oct. 25, 2006

(65) Prior Publication Data

US 2008/0104202 A1    May 1, 2008

(51) Int. Cl.
| G06F 15/16 | (2006.01) |
| H04N 7/16 | (2011.01) |
| H04N 21/41 | (2011.01) |
| H04N 21/414 | (2011.01) |
| H04N 21/4147 | (2011.01) |
| H04N 21/433 | (2011.01) |

(Continued)

(52) U.S. Cl.
CPC .......... *H04N 7/163* (2013.01); *H04N 21/4135* (2013.01); *H04N 21/4147* (2013.01); *H04N 21/41422* (2013.01); *H04N 21/4334* (2013.01); *H04N 21/43615* (2013.01); *H04N 21/4583* (2013.01); *H04N 21/84* (2013.01)

(58) Field of Classification Search
CPC ................... H04N 21/43615; H04N 21/4135; H04N 21/4334; H04N 7/163; H04N 21/41422; H04N 21/4147; H04N 21/4583; H04N 21/84
USPC ............ 709/219, 226; 725/78, 83, 89, 93, 96, 725/100, 102, 133, 141, 29
See application file for complete search history.

(56) References Cited

U.S. PATENT DOCUMENTS

| 4,466,063 A | * | 8/1984 | Segarra et al. ................. 709/226 |
| 5,625,845 A | * | 4/1997 | Allran et al. .................. 719/322 |

(Continued)

FOREIGN PATENT DOCUMENTS

| WO | WO0054506 | 9/2000 |
| WO | WO0067449 | 11/2000 |

OTHER PUBLICATIONS

Cherklasova, et al., "Providing Resource Allocation and Performance Isolation in a Shared Streaming-Media Hosting Service", SAC '04, ACM Symposium on Applied Computing, Mar. 2004, pp. 1213-1218.

(Continued)

*Primary Examiner* — Azizul Choudhury
*Assistant Examiner* — Anthony Fabbri
(74) *Attorney, Agent, or Firm* — Micah P. Goldsmtih; Judy Yee; Micky Minhas

(57) ABSTRACT

Multi-DVR (digital video recorder) media content arbitration is described. In an embodiment, client devices are each a node of a multi-DVR system where the nodes are implemented for communication with each other. An arbitration algorithm can arbitrate media content rendered by the client devices so as not to exceed a media content usage capacity of the multi-DVR system. Each of the client devices of the multi-DVR system can communicate status messages to each of the other client devices to indicate rendered media content, and can receive the status messages from each of the other client devices. Each of the client devices can also implement the arbitration algorithm to independently determine which of the client devices has lowest priority media content that can be terminated to provide capacity for higher priority media content at one of the client devices of the multi-DVR system.

20 Claims, 7 Drawing Sheets

(51) Int. Cl.
*H04N 21/436* (2011.01)
*H04N 21/458* (2011.01)
*H04N 21/84* (2011.01)

(56) References Cited

U.S. PATENT DOCUMENTS

| | | | |
|---|---|---|---|
| 5,633,859 A * | 5/1997 | Jain et al. | 370/234 |
| 5,787,264 A * | 7/1998 | Christiansen et al. | 710/113 |
| 5,884,046 A * | 3/1999 | Antonov | 709/238 |
| 5,922,051 A * | 7/1999 | Sidey | 709/223 |
| 5,996,022 A * | 11/1999 | Krueger et al. | 709/247 |
| 6,130,892 A * | 10/2000 | Short et al. | 370/401 |
| 6,160,547 A | 12/2000 | Roth | |
| 6,237,049 B1 | 5/2001 | Ludtke | |
| 6,345,279 B1 * | 2/2002 | Li et al. | 1/1 |
| 6,363,434 B1 * | 3/2002 | Eytchison | 719/313 |
| 6,393,430 B1 * | 5/2002 | Van Ryzin | 1/1 |
| 6,487,622 B1 * | 11/2002 | Coskrey et al. | 710/241 |
| 6,505,348 B1 * | 1/2003 | Knowles et al. | 725/49 |
| 6,510,210 B1 * | 1/2003 | Baughan | 379/90.01 |
| 6,553,404 B2 * | 4/2003 | Stern | 709/203 |
| 6,889,207 B2 * | 5/2005 | Slemmer et al. | 705/54 |
| 6,993,786 B1 * | 1/2006 | Maruya et al. | 725/88 |
| 7,035,355 B2 | 4/2006 | Lais et al. | |
| 7,039,737 B1 | 5/2006 | Dorr et al. | |
| 7,095,732 B1 * | 8/2006 | Watson, Jr. | 370/346 |
| 7,111,319 B1 * | 9/2006 | Watkins | 725/139 |
| 7,130,532 B2 * | 10/2006 | Nakaya | 386/230 |
| 7,243,364 B2 * | 7/2007 | Dunn et al. | 725/93 |
| 7,424,535 B2 * | 9/2008 | Karaoguz et al. | 709/226 |
| 7,568,129 B2 * | 7/2009 | Sugihara | 714/42 |
| 7,707,602 B2 * | 4/2010 | Cragun et al. | 725/28 |
| 7,814,144 B2 * | 10/2010 | Koyama et al. | 709/203 |
| 7,908,626 B2 * | 3/2011 | Williamson et al. | 725/90 |
| 7,984,114 B2 * | 7/2011 | Bankers et al. | 709/219 |
| 8,452,885 B2 * | 5/2013 | Sherer et al. | 709/231 |
| 8,776,149 B1 * | 7/2014 | Koch et al. | 725/88 |
| 2002/0002667 A1 * | 1/2002 | Kelsey et al. | 712/228 |
| 2002/0059458 A1 * | 5/2002 | Deshpande et al. | 709/246 |
| 2003/0037228 A1 * | 2/2003 | Kelsey et al. | 712/245 |
| 2003/0070182 A1 * | 4/2003 | Pierre et al. | 725/135 |
| 2003/0120928 A1 * | 6/2003 | Cato et al. | 713/176 |
| 2003/0126211 A1 * | 7/2003 | Anttila et al. | 709/205 |
| 2003/0172213 A1 * | 9/2003 | Garcia et al. | 710/113 |
| 2004/0008894 A1 * | 1/2004 | Zeineh | 382/240 |
| 2004/0088728 A1 * | 5/2004 | Shimizu | 725/89 |
| 2004/0111492 A1 * | 6/2004 | Nakahara et al. | 709/219 |
| 2004/0221246 A1 * | 11/2004 | Emerson et al. | 716/1 |
| 2005/0004995 A1 * | 1/2005 | Stochosky | 709/219 |
| 2005/0055716 A1 * | 3/2005 | Louie et al. | 725/58 |
| 2005/0071882 A1 * | 3/2005 | Rodriguez et al. | 725/95 |
| 2005/0183123 A1 * | 8/2005 | Lee et al. | 725/47 |
| 2005/0289224 A1 * | 12/2005 | Deslippe et al. | 709/208 |
| 2005/0289594 A1 * | 12/2005 | Numakami et al. | 725/45 |
| 2006/0074750 A1 * | 4/2006 | Clark et al. | 705/14 |
| 2006/0095634 A1 * | 5/2006 | Meyer | 710/309 |
| 2006/0195873 A1 * | 8/2006 | Gopalan et al. | 725/100 |
| 2007/0033531 A1 * | 2/2007 | Marsh | 715/738 |
| 2007/0118871 A1 * | 5/2007 | Crohas | 725/134 |
| 2007/0199022 A1 * | 8/2007 | Moshiri et al. | 725/39 |
| 2007/0250880 A1 * | 10/2007 | Hainline | 725/97 |
| 2008/0016196 A1 * | 1/2008 | MacMillan et al. | 709/223 |
| 2009/0028192 A1 * | 1/2009 | Rieger et al. | 370/535 |
| 2009/0222875 A1 * | 9/2009 | Cheng et al. | 725/147 |

OTHER PUBLICATIONS

Hosseini-Khayat, et al., "A Simple and Efficient Bus Management Scheme that Supports Continuous Streams", ACM Transactions on Computer Systems, vol. 13, No. 2, May 1995, pp. 122-140.

Khayat, et al., "A Proposed Bus Arbitration Scheme for Multimedia Workstations", IEEE, 1994, pp. 415-423.

\* cited by examiner

MULTI-DVR MEDIA CONTENT ARBITRATION

BACKGROUND

Television viewing is increasingly on-demand to deliver requested media content to viewers. On-demand media content can include any type of recorded media, such as television programs, recorded programs, on-demand videos, and pay-per-view movies, any of which viewers can request for viewing when convenient rather than at a scheduled broadcast time. As on-demand media content is requested more often and by an increasing number of viewers, content providers face an increasing need to provide adequate session capacity to timely deliver the requested media content with a high quality of service.

A typical household may have four, five, or more, television viewing areas and/or rooms with televisions, most of which consumers expect to have television content provided by a television programming content provider. In an IP-based television (IPTV) system, a client device does not include a physical tuner like a conventional television set-top box, for example. Rather the television programming content and other media content is delivered to the household as IP-based data via a communication network.

In a multi-room viewing system, a primary device typically receives the television programming and other media content as the IP-based data, and then allocates the content to the other television system client devices of the viewing system. The primary device manages viewing and recording conflicts for the viewing system, such as recording times and bandwidth conflicts between the various data streams that are allocated to the other client devices and to viewer requested actions, such as a request for a data stream to view live television, receive video on-demand, listen to an audio channel, and the like.

The primary device of a multi-room viewing system also controls or manages the DVR (digital video recorder) functionality and utility in the overall system because the other client devices do not have the same DVR functionality and utility as the primary device in the system. If the primary device of a multi-room viewing system is missing or taken out of service, the other client devices of the viewing system may be rendered unusable, or unable to manage bandwidth and media content allocation conflicts.

SUMMARY

This summary is provided to introduce simplified concepts of multi-DVR (digital video recorder) media content arbitration which is further described below in the Detailed Description. This summary is not intended to identify essential features of the claimed subject matter, nor is it intended for use in determining the scope of the claimed subject matter.

In an embodiment of multi-DVR media content arbitration, client devices are each a node of a multi-DVR system where the nodes are implemented for communication with each other. An arbitration algorithm can arbitrate media content rendered by the client devices so as not to exceed a media content usage capacity of the multi-DVR system. Each of the client devices of the multi-DVR system can communicate status messages to each of the other client devices to indicate rendered media content, and can receive the status messages from each of the other client devices. Each of the client devices can also implement the arbitration algorithm to independently determine which of the client devices has lowest priority media content that can be terminated to provide capacity for higher priority media content at one of the client devices of the multi-DVR system.

In other embodiment(s) of multi-DVR media content arbitration, each of the client devices of the multi-DVR system implement the arbitration algorithm to arbitrate media content usage so as not to exceed a bandwidth capacity and/or a maximum number of media content streams of the multi-DVR system. Arbitrating the media content can include prioritizing a more recent media content tune at one client device over a previous media content tune at a different client device to determine which of the client devices has the lowest priority media content that can be terminated. Further, a client device having the lowest priority media content can be determined by a duration of rendered media content at a client device without an indication, such as a remote control input, that a viewer is watching the media content.

BRIEF DESCRIPTION OF THE DRAWINGS

The same numbers are used throughout the drawings to reference like features and components.

DETAILED DESCRIPTION

Multi-DVR (digital video recorder) media content arbitration is described for a multi-DVR system that includes any number of DVR nodes of the system, as well as recording node(s). Client devices are each a node of the multi-DVR system where the nodes are implemented for communication with each other to act and make decisions on behalf of other nodes, for the overall common good of the multi-DVR system, and based on the state of individual nodes and/or based on the state of the multi-DVR system. In a multi-DVR environment, limited available bandwidth to share media content stream resources among the node devices can be arbitrated by the devices themselves.

Each node of the multi-DVR system can communicate a node status message to the other client devices at the respective nodes of the multi-DVR system, and each node of the system can receive the node status messages from the other client devices in the system. Each of the client devices can also implement an arbitration algorithm to arbitrate media content rendered by the client devices so as not to exceed a media content usage capacity of the multi-DVR system, such as a bandwidth capacity and/or a maximum number of media content streams of the multi-DVR system. Each of the client devices can then independently determine which of the client devices has lowest priority media content that can be terminated to provide capacity for higher priority media content at one of the client devices of the multi-DVR system.

While aspects of the described systems and methods for multi-DVR media content arbitration can be implemented in any number of different computing systems, environments, entertainment systems, and/or configurations, embodiments of multi-DVR media content arbitration are described in the context of the following example systems and environments.

Figure 1:
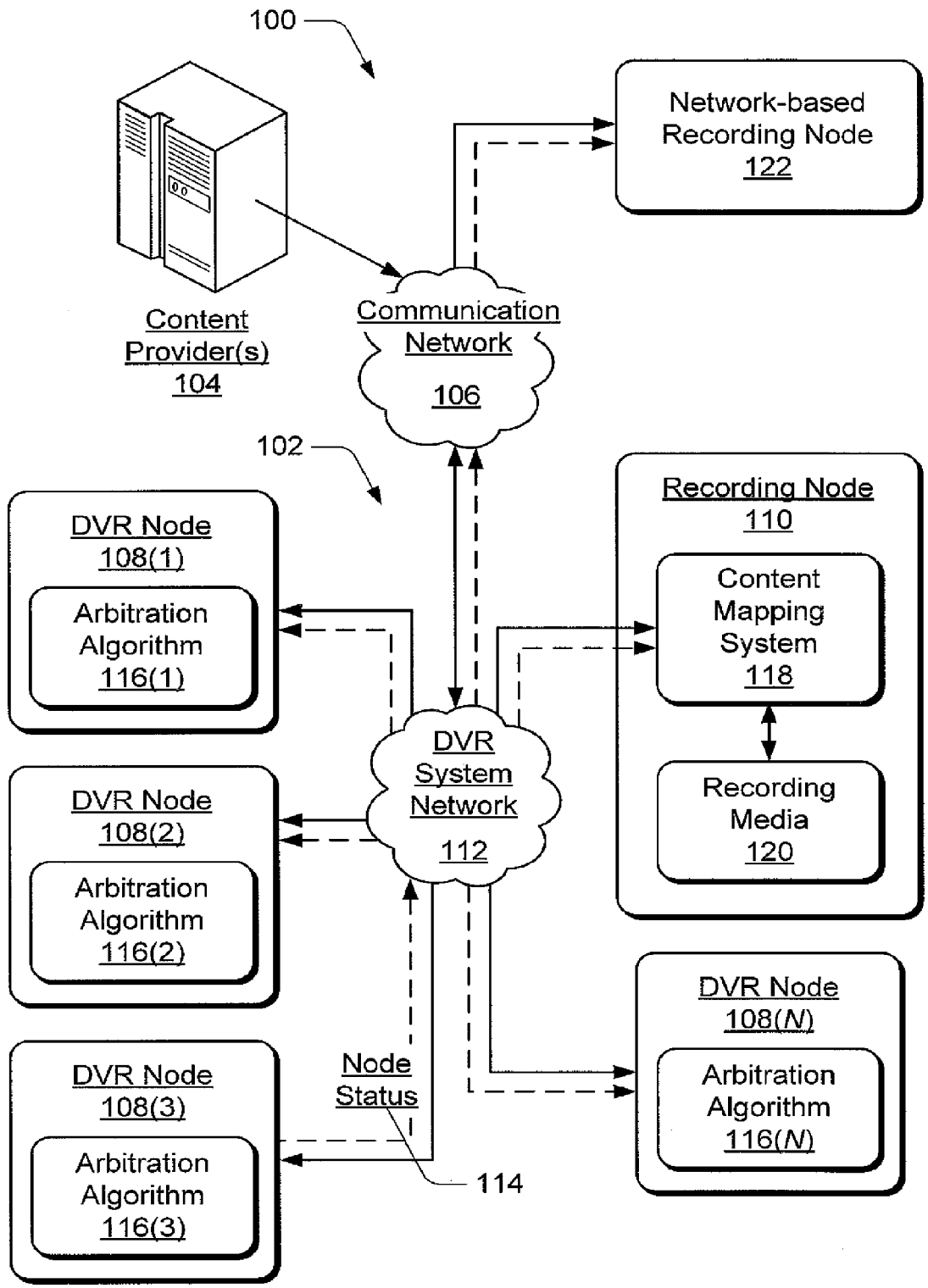
FIG. 1 illustrates an example environment in which embodiments of multi-DVR media content arbitration can be implemented.

FIG. 1 illustrates an example environment 100 in which embodiments of multi-DVR media content arbitration can be implemented. The environment 100 includes a multi-DVR system 102, such as may be implemented in a household as a viewing system that has several viewing areas or different rooms for viewing television programs. An example of a multi-DVR system is described with reference to the example IP-based television (IPTV) system shown in FIG. 5. The multi-DVR system 102 is configured for communication with any number of different content provider(s) 104 via a communication network 106.

Any of the systems and/or devices can be configured for network access in any number of embodiments and varieties of implementation. The communication network 106 can be implemented as any one or combination of a wide area network (e.g., the Internet), a local area network (LAN), an intranet, an IP-based network, broadcast network, a public telephone network, a wireless network, or other media content distribution network. Additionally, communication network 106 can be implemented using any type of network topology and any network communication protocol, and can be represented or otherwise implemented as a combination of two or more networks.

The multi-DVR system 102 includes DYR nodes 108(1-N) and, optionally, a recording node 110, all of which communicate with each other via a DVR system network 112. In an embodiment, the DVR nodes 108(1-N) can each be implemented to include a client device and/or can be implemented as a client system as described with reference to the example IP-based television (IPTV) system shown in FIG. 5. A client system can include a client device and a display device, such as any type of television, monitor, LCD, or similar television-based display system that together renders audio, video, and/or image data.

A DVR node 108 may also be implemented as any one or combination of a client device, a gaming console, or as any other computing-based device, such as a desktop computer, a portable computer, a set-top box, a digital video recorder (DVR) and playback system, an appliance device, a gaming system, and/or as any other type of computing-based client device. A client device at a node 108 of the multi-DVR system 102 may also be associated with a user (i.e., a person) and/or an entity that operates a client device such that the client device describes logical clients that include users, software, and/or devices.

As a television system client device, a node 108 of the multi-DVR system 102 can be implemented with one or more processors, a communication module, memory components, and a content rendering system which can be implemented as computer executable instructions and executed by the processor(s) to implement embodiments of multi-DVR media content arbitration. Additionally, a client device at a node 108 of the multi-DVR system 102 may be implemented with any number and combination of differing components as further described below with reference to the example client device shown in FIG. 6.

A television system client device at a node 108 of the multi-DVR system 102 can receive programs, associated program content, various forms of media content, program guide data, advertising content, and other types of media content from the content provider(s) 104 via the communication network 106. Media content can include television programs (or programming) which may be any form of programs, commercials, music, movies, and video on-demand media content. Other media content can include recorded media content, interactive games, network-based applications, and any other similar audio, video, and/or image content. In addition, media content in general may include music streamed from a computing device to a client device, such as a television set-top box, and may also include video on-demand media content delivered from a server, and any other audio, video, and/or image content received from any type of media content source.

In various embodiments of multi-DVR media content arbitration, each of the nodes 108(1-N) of the multi-DVR system 102 can communicate with each other to act and make decisions on behalf of the other nodes 108(1-N), for the overall common good of the multi-DVR system 102, and based on the state of individual nodes 108 and/or based on the state of the multi-DVR system 102. The nodes 108(1-N) can communicate with each other to indicate such information as what type of media content a node is rendering, a bit rate of the service, an indication of whether the service is a multicast or unicast (such as a video on-demand), recording status, playback status, operational status, recording requests, and/or any other type of node-based information and requests. A node 108 of the multi-DVR system 102 can then make an operational decision based on what it knows about the operational status of the other node(s), rather than waiting for an instruction to make an operational decision. With this "awareness" approach, the multi-DVR system 102 can be implemented without a master device having to control each of the other client devices at the nodes 108(1-N) of the multi-DVR system 102.

Each DVR node 108 of the multi-DVR system 102 can communicate a node status message 114 that is unicast to all of the other DVR nodes 108(1-N) and to the recording node 110. In an embodiment, a node status message can represent various in-band metadata sources. In this example, the node status message 114 is communicated from DVR node 108(3) (represented by the dashed lines) to all of the other DVR nodes 108(1-N) and to recording node 110 via the DVR system network 112. Additionally, each DVR node 108 of the multi-DVR system 102 can receive a node status update message from each of the client devices at the DVR nodes 108(1-N) of the multi-DVR system 102 for real-time updates of media content information at all of the nodes in the system.

Each node 108(1-N) of the multi-DVR system 102 is network aware and decisions are based on the aggregate needs of the client devices which can all have the same policies. In this example, the client devices at the nodes 108(1-N) of the multi-DVR system 102 each include a respective instantiation of an arbitration algorithm 116(1-N). As described above, every node 108(1-N) has context of every other node in the system from the node status messages, and based on knowing the aggregate bandwidth and/or media content stream capacity of the overall service, can make decisions about whether it can tune to obtain a resource, such as a media content stream, and thereby deprive another client device in the system of the resource. For example, rather than a first client device being commanded or instructed from another of the client devices to detune from a media content stream, the first device will independently determine that it has to detune from a media content stream based on the aggregate system status.

For example, the multi-DVR system 102 may have three high definition televisions, one each at the nodes 108(1-3), but bandwidth for only two high definition services. If two of the televisions are tuned to receive high definition media content, and the third television is then initiated to also receive high definition media content, the system 102 has to determine whether to allocate the media content stream from either of the other two nodes. The arbitration algorithm 116 at each of the nodes 108(1-N) of the multi-DVR system 102 can be implemented to arbitrate these and other types of decisions in various embodiments of multi-DVR media content arbitration.

The arbitration algorithm 116 at each of the nodes 108(1-N) of the multi-DVR system 102 can be implemented to arbitrate media content rendered by the node client devices so as not to exceed a media content usage capacity of the multi-DVR system 102, such as a bandwidth capacity and/or a maximum number of media content streams in the multi-DVR system 102. The arbitration policies can be based on a priority of the media content being rendered at the different node client devices in the system. For example, each node 108(1-N) of the multi-DVR system 102 can independently determine the same client device that has the lowest priority media content which can be terminated to provide capacity for higher priority media content at one of the other node client devices of the multi-DVR system 102. Only the client device that is rendering the lowest priority media content acts on its own accord to release the resource such that the higher priority media content can be rendered at a different node of the multi-DVR system 102.

The priority of media content being rendered at the nodes 108(1-N) of the multi-DVR system 102 can be ordered from a high priority to a low priority for recorded media content, on-demand media content, live media content (such a live television and music streams), and then picture-in-picture media content. The rendered media content can then also be prioritized based on a more recent media content tune at a first client device over a previous media content tune at a second client device.

Additionally, the arbitration algorithm 116 can determine the lowest priority media content by a duration of rendered media content without an indication that a viewer is watching the media content at a node client device. An indication that a viewer is watching media content at a node 108 of the system 102 can include any type of viewer action at the node and/or a remote control input, such as a channel change, a volume adjust, a fast-forward command, a pause command, an information or program guide button input, or any other type of indication that a user is still watching the media content at a node 108 of the system 102. This type of arbitration decision would presume that the lowest priority media content is being rendered at a node having the most time without any indication that a viewer is watching the media content, such as if a viewer has left the viewing area, but did not turn the television off.

As described above, the node status messages communicated between all of the nodes 108(1-N) of the multi-DVR system 102 can include such information as what type of media content a node is rendering and any type of viewer input or indication that the media content being rendered at a node is being watched by a viewer. Each node 108 can broadcast its own last activity to all of the other nodes of the multi-DVR system 102 via a node status message 114.

When the lowest priority media content is determined, the arbitration algorithm 116 can be implemented to initiate other options rather than simply detuning the node client device that is rendering the lowest priority media content. The options may include retuning the client device to a different media content stream, such as from rendering a program in high definition to rendering the program in low definition, thereby deallocating enough bandwidth such that the higher priority media content can be rendered at a different node client device of the multi-DVR system 102.

In addition to retuning to a smaller bandwidth stream, the options can include joining another media content stream that is already in progress and/or monitoring the loss of a media content stream to determine when it would again be available. In addition (or alternatively), the arbitration algorithm 116 can be implemented to not only detune the lowest priority media content so as not to exceed the media content usage capacity of the multi-DVR system 102, but the arbitration algorithm 116 can be implemented to determine the lowest number of media content streams to detune at any of the various nodes 108 of the system 102 so as not to exceed the media content usage capacity of the system.

The node status messages communicated between all of the nodes 108(1-N) of the multi-DVR system 102 may also include a priority adjustment factor, such as an offset or multiplier, that artificially adjusts the media content priority determination at a node 108 of the system 102. For example, the node 108(1) of the multi-DVR system 102 may be user-designated as having a higher priority than the other nodes 108(2-N), and have a thirty minute offset, a scaling multiplier, or other type of priority adjustment factor. The node 108(1) may then be determined to have the lowest priority media content because there has been no indication for two hours that a viewer is still watching the media content being rendered at node 108(1). However, if the node 108(1) has a thirty minute priority adjustment factor, the arbitration algorithm 116 (at all of the nodes 108(1-N) in the system 102) can determine that the lowest priority media content is being rendered at node 108(2) which has had no indication for only an hour and forty-five minutes that a viewer is still watching the rendered media content at node 108(2).

To avoid oversubscribing the multi-DVR system 102 and entering into a condition where the media content usage capacity of the system would be exceeded, the arbitration algorithm(s) 116(1-N) at each of the node client devices can be implemented to pre-determine what the overall system response would be to a new request for media content at one of the nodes 108. A node at which a new request for media content is initiated can communicate a provisional tune status message to all of the other nodes 108(1-N) of the multi-DVR system 102 such that the overall system response can be determined prior to the new media content being rendered at the requesting node. In an embodiment, a user interface can be provided at the requesting node 108 where a viewer intends to initiate the new request to indicate viewer options and system status, such as an indication that the new request for media content would detune another of the nodes, and providing the viewer with the option to proceed with the request or not.

In the example environment 100, the recording node 110 of the multi-DVR system 102 includes a content mapping system 118 and recording media 120. In an embodiment, any one or more of the client devices at the nodes 108(1-N) of the multi-DVR system 102 can be implemented as the recording node 110 which includes the recording media 120 to record media content received from a content provider 104. Alternatively (or in addition), a recording node of the multi-DVR system 102 can be implemented as a network-based recording node 122 that the multi-DVR system 102 communicates with via the communication network 106. The network-based recording node 122 can also include a content mapping system and a recording media.

A recording node 110, 122 can record media content with the recording media for any one or more of the DVR nodes 108 of the multi-DVR system 102. For example, a client device at a node 108 of the multi-DVR system 102 can initiate a record request to have media content recorded. A record request can be initiated for a scheduled recording or to record and provide a pause buffer for a DVR node 108 of the multi-DVR system 102. The recording node 110 can receive the record request and record the media content such that the client device at the DVR node 108 can access and render the recorded media content from the recording node via the DVR system network 112. The record request from the client device at the DVR node 108 of the multi-DVR system 102 can include a media content identifier of the media content, a record start time, and a record stop time such that the recording node 110 can identify the media content when received from a content provider 104 via the communication network 106.

Figure 2:
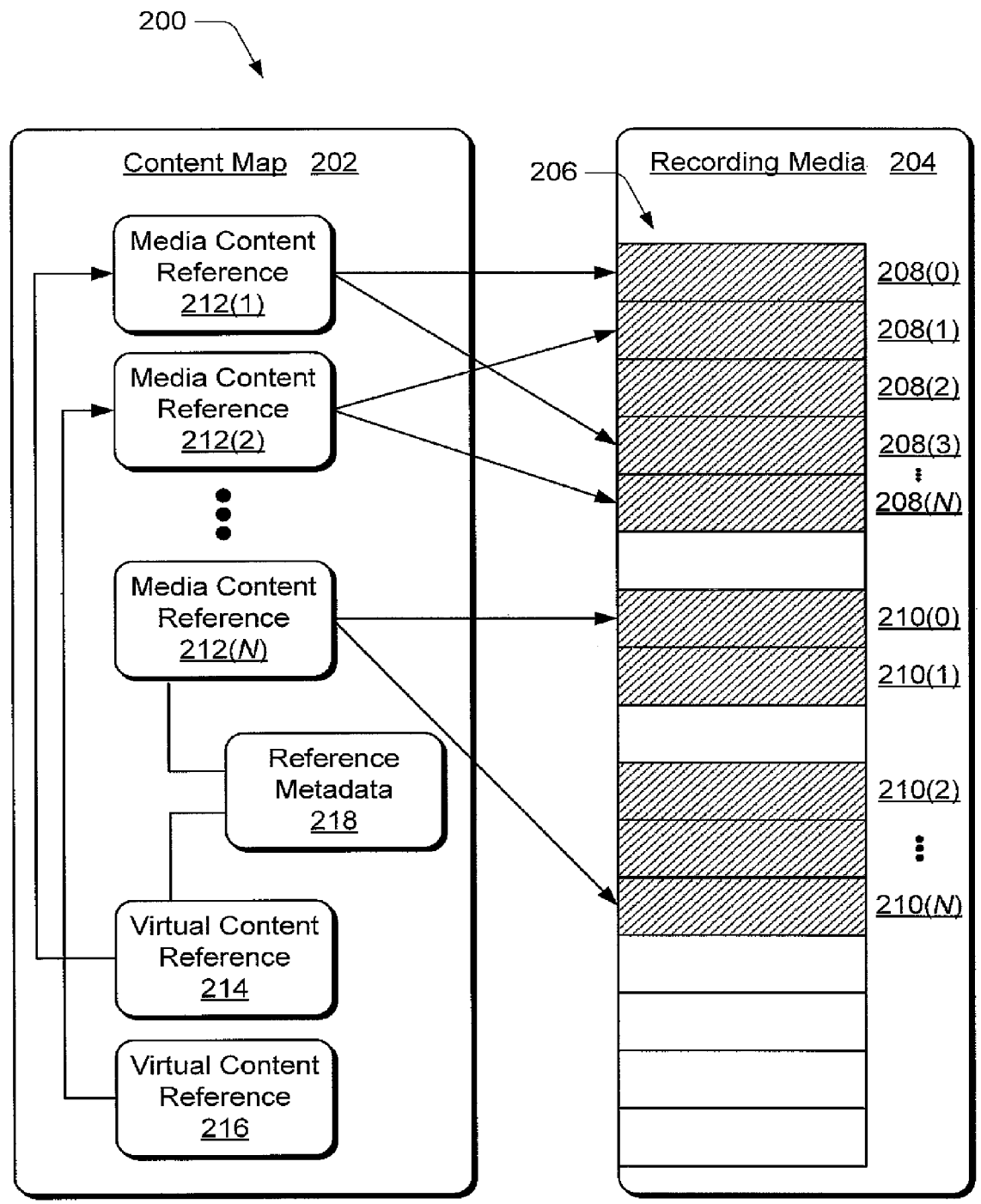
FIG. 2 illustrates an example content mapping system in which embodiments of multi-DVR media content arbitration can be implemented.

FIG. 2 illustrates an example content mapping system 200 in which embodiments of multi-DVR media content arbitration can be implemented. The content mapping system 200 can be implemented as the content mapping system 118 at recording node 110 described with reference to FIG. 1. The content mapping system 200 includes a content map 202 and one or more recording media 204 that includes memory segments 206 (also referred to as data blocks) which are each of a size that corresponds to several minutes of media content (such as video).

Media content, such as a television program, can be recorded into the memory segments 206 which are then allocated as memory segments 208(0-N) that are illustrated to represent having been recorded. For example, the allocated memory segments 208(0-N) can be recorded as a scheduled recording or as a pause buffer for a client device at a DVR node 108 of the multi-DVR system 102 shown in FIG. 1. Similarly, allocated memory segments 210(0-N) are illustrated to represent having been recorded to maintain media content for a client device at a node 108 of the multi-DVR system 102. Additionally, the allocated memory segments 210(0-N) illustrate that allocated memory segments do not have to be consecutive in a recording media 204.

The content map 202 includes media content references 212(1-N) that each reference to the recording media 204 to designate recorded media content that is associated with a client device at a DVR node of a multi-DVR system. A media content reference may also be mapped to different overlapping recording requests, and not just to the different client devices. In this example, media content reference 212(1) references to the allocated memory segments 208(0-3), media content reference 212(2) references to the overlapping allocated memory segments 208(1-N), and media content reference 212(N) references to the allocated memory segments 210(0-N).

A media content reference 212 can be implemented as a computing-based programming reference, a pointer, and/or as any other type of content mapping reference to allocated memory segments or blocks. In this example, the media content references 212(1-N) are each pointers to start and end points in the physical recording media 204 over a range of the allocated memory segments. Media content references 212(1) and 212(2) illustrate that the media content references can be mapped to overlapping allocated memory segments of the same recording 208(0-N). As such, pause buffers for different client devices can be overlapping. This provides that a viewer can tune to a channel that someone else is watching, rewind back to a previous program in that pause buffer, and select to record the program. Additionally, two different client devices can be recording the same program on the same channel, such as denoted by media content reference 212(1) which references to the allocated memory segments 208(0-3) and media content reference 212(2) which references to the allocated memory segments 208(1-N) such that viewers at the two different client devices each have a continuous viewing experience.

The content map 202 also includes virtual content references 214 and 216 which are each a reference to a media content reference 212 such that recorded media content associated with a client device via the media content reference is also associated with an additional client device via the virtual content reference. For example, virtual content reference 214 references to media content reference 212(1) which references to the allocated memory segments 208(0-3). Similarly, virtual content reference 216 references to media content reference 212(2) which references to the allocated memory segments 210(1-N).

Virtual content references provide for multiple references to a single recording for any number of client devices at various nodes of a multi-DVR system. For example, a viewer at DVR node 108(1) may tune the corresponding client device in the multi-DVR system 102 to receive and watch the media content associated with a particular television channel. In addition, the recording node 110 can begin recording a pause buffer for DVR node 108(1) and a media content reference 212(1) is generated to designate the recorded media content in the recording media 204 as being associated with the client device. A second viewer at DVR node 108(2) may then initiate a recording of the same media content associated with the particular television channel. A virtual content reference 214 is then generated in the content map 202 which references to the media content reference 212(1) such that the second client device is also associated with the recorded media content.

If the viewer at DVR node 108(1) then tunes the corresponding client device to receive different media content, the recording node 110 can continue to record the media content if the client device at DVR node 108(2) continues the recording. If the viewer at DVR node 108(2) stops the recording, then the recording node 110 can stop recording the media content, yet maintain the recorded media content with the recording media 204. If a viewer at yet a third DVR node 108(3) also initiates a recording of the same media content associated with the particular television channel, another virtual content reference 216 is generated which also references to the media content reference 212(1) such that the third client device is also associated with the recorded media content. The virtual content references 214, 216 provide that two different DVR nodes 108 of the multi-DVR system 102 are served by the same recorded media content where the multiple content references can intersect, overlap in time, and the like.

The content map 202 also includes reference metadata 218 which, in an embodiment, corresponds to a media content reference 212 and is associated with the recorded media content designated by the media content reference. In another embodiment, the reference metadata 218 corresponds to a virtual content reference 214 and is associated with the recorded media content designated by the virtual content reference (via a media content reference).

The reference metadata 218 that corresponds to a media content reference 212 can include a time-based index to a segment of the recorded media content where the time is an absolute time reference. The reference metadata 218 can also include attributes that are associated with the allocated memory segments, such as mapped index points from which the recorded media can be accessed and rendered, the extents or chain of allocated memory segments, a time offset within an extent, and/or any other data associated with recorded media content. The reference metadata 218 that corresponds to a virtual content reference includes attributes such as a start time and an end time of the recorded media content, and an identifier of the media content.

Figure 3:
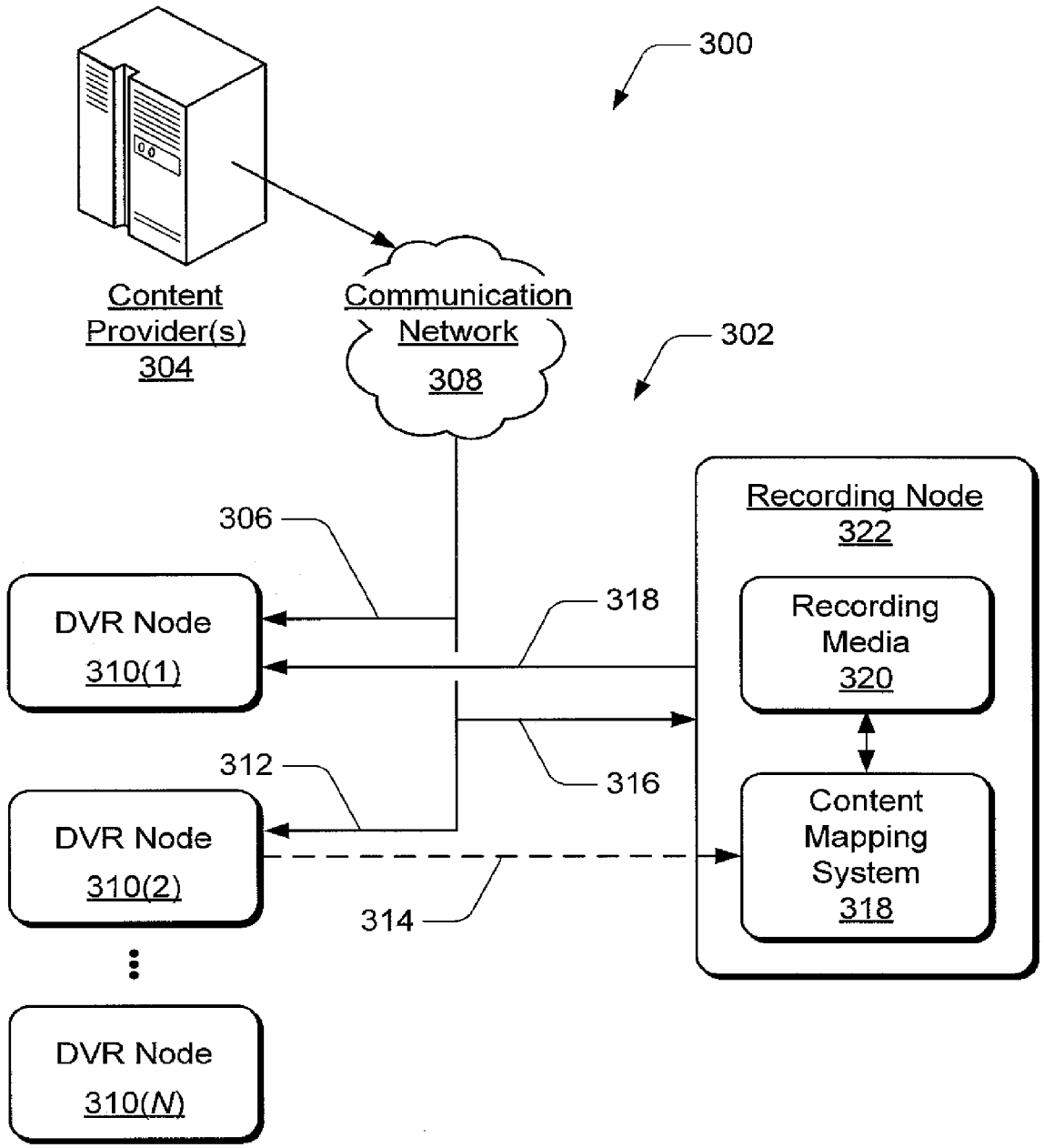
FIG. 3 illustrates an example of media content transition utilizing the example content mapping system shown in FIG. 2.

FIG. 3 illustrates an example of media transition 300 in which a DVR node of a multi-DVR system 302 can seamlessly switch from a live media content stream to recorded playback. In the example media transition 300, a content provider 304 communicates a live stream of media content 306 via a communication network 308 to a DVR node 310(1) of the multi-DVR system 302. A second DVR node 310(2) of the multi-DVR system 302 can also receive the live media content stream 312, where the media content is multicast to the multi-DVR system 302. The second DVR node 310(2) can initiate 314 that the media content be recorded 316 via a content mapping system 318, such as in a pause buffer (recording media) 320 at a recording node 322 of the multi-DVR system 302.

The first DVR node 310(1) can then transition from the content stream 306 to receive the recorded media content 318 from the recording node 322 without discontinuity of the media content. In an embodiment, the content mapping system 318 can generate a media content reference to associate the recorded media content with the second DVR node 310(2) that initiates the recording. The content mapping system 318 can then generate a virtual content reference to the media content reference to also associate the recorded media content with the first DVR node 310(1). The first DVR node 310(1) can then transition from the content stream 306 to the recorded media content 318 based on a time-based index corresponding to both the media content of the content stream which is synchronous with the recorded media content.

Generally, any of the functions and methods described herein can be implemented using hardware, software, firmware (e.g., fixed logic circuitry), manual processing, or any combination thereof. A software implementation represents program code that performs specified tasks when executed on a computing-based processor. Example method 400 described with reference to FIG. 4 may be described in the general context of computer executable instructions. Generally, computer executable instructions can include applications, routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment computer executable instructions may be located in both local and remote computer storage media, including memory storage devices. Further, the features described herein are platform-independent such that the techniques may be implemented on a variety of computing platforms having a variety of processors.

Figure 4:
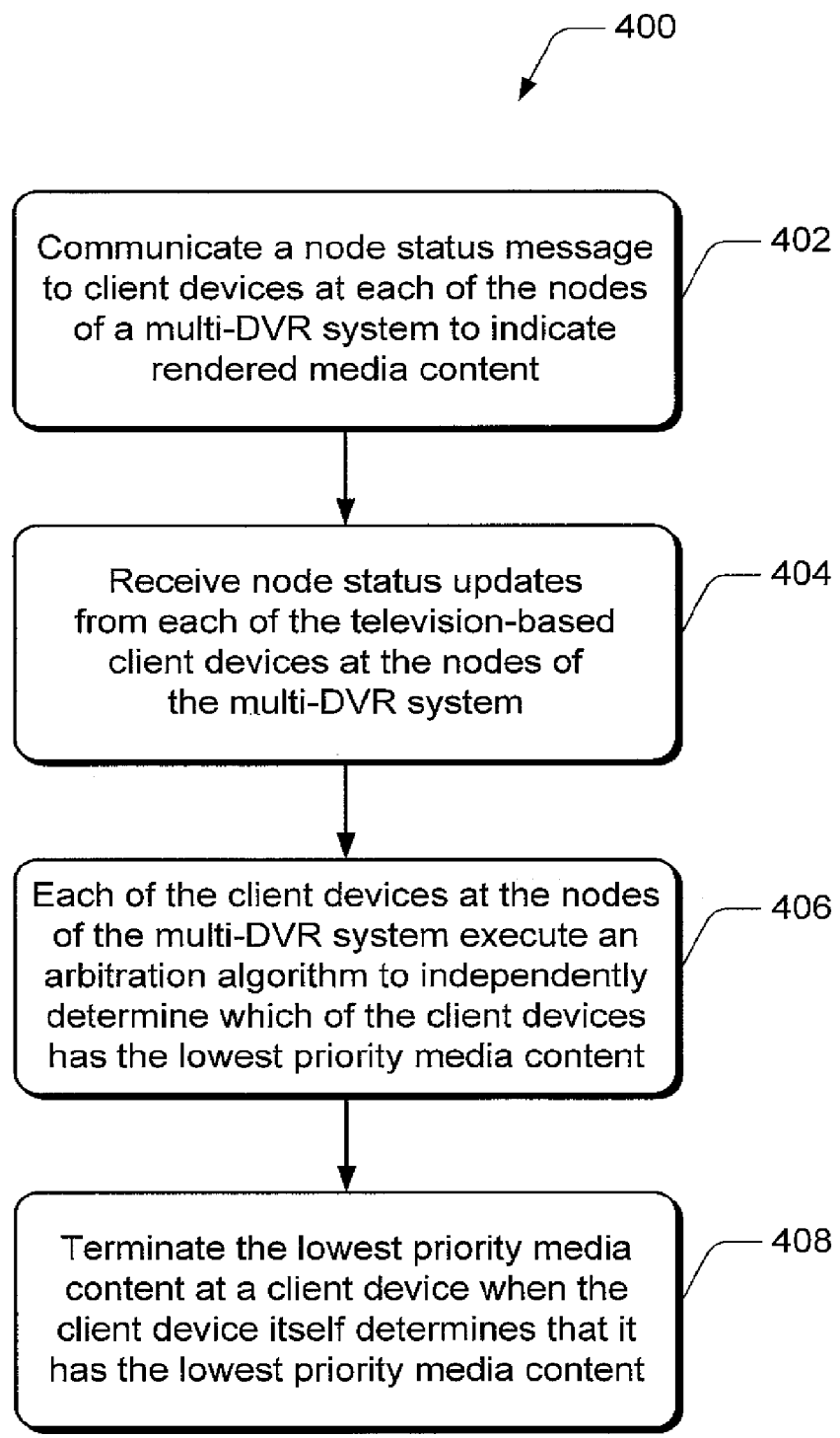
FIG. 4 illustrates example method(s) for multi-DVR media content arbitration.

FIG. 4 illustrates example method(s) 400 for multi-DVR media content arbitration and is described with reference to the example environment shown in FIG. 1. The order in which the method is described is not intended to be construed as a limitation, and any number of the described method blocks can be combined in any order to implement the method, or an alternate method.

At block 402, a node status message is communicated to client devices at each of the nodes of a multi-DVR system to indicate rendered media content. For example, a client device at DVR node 108(3) communicates a node status message 114 to all of the client devices at the other nodes 108 of the multi-DVR system 102 via the DVR system network 112. A node status message 114 can include a media content identifier and a type of the media content being rendered at DVR node 108(3).

At block 404, node status messages are received from each of the client devices at the nodes of the multi-DVR system where the status messages indicate rendered media content. For example, DVR node 108(1) receives node status updates (e.g., node status 114) from each of the client devices at the DVR nodes 108(2-N) of the multi-DVR system 102.

At block 406, an arbitration algorithm is executed by each of the client devices to independently determine which of the client devices has the lowest priority media content that can be terminated to provide capacity for higher priority media content at one of the other client devices of the multi-DVR system. For example, each of the client devices at the nodes 108(1-N) of the multi-DVR system 102 execute the arbitration algorithm 116 to independently determine the same client device of the multi-DVR system that has the lowest priority media content that can be terminated so as not to exceed a bandwidth capacity and/or a maximum number of media content streams in the multi-DVR system 102.

The arbitration algorithm 116 can prioritize the rendered media content at the nodes 108(1-N) of the multi-DVR system 102 based on a more recent media content tune at a first client device over a previous media content tune at a second client device. Additionally, the arbitration algorithm 116 can determine the lowest priority media content by a duration of rendered media content without an indication that a viewer is watching the media content at a node client device. An indication that a viewer is watching media content at a node 108 of the system 102 can include any type of viewer action at the node, a remote control input, and/or any other type of indication that a user is still watching the media content at a DVR node 108 of the multi-DVR system 102.

At block 408, the lowest priority media content at a client device is terminated by the client device itself when determining that it has the lowest priority media content. Only the client device at a node 108(1-N) of the multi-DVR system 102 that is rendering the lowest priority media content needs to act on its own accord to release the resource such that higher priority media content can be rendered at a different node of the multi-DVR system.

Figure 5:
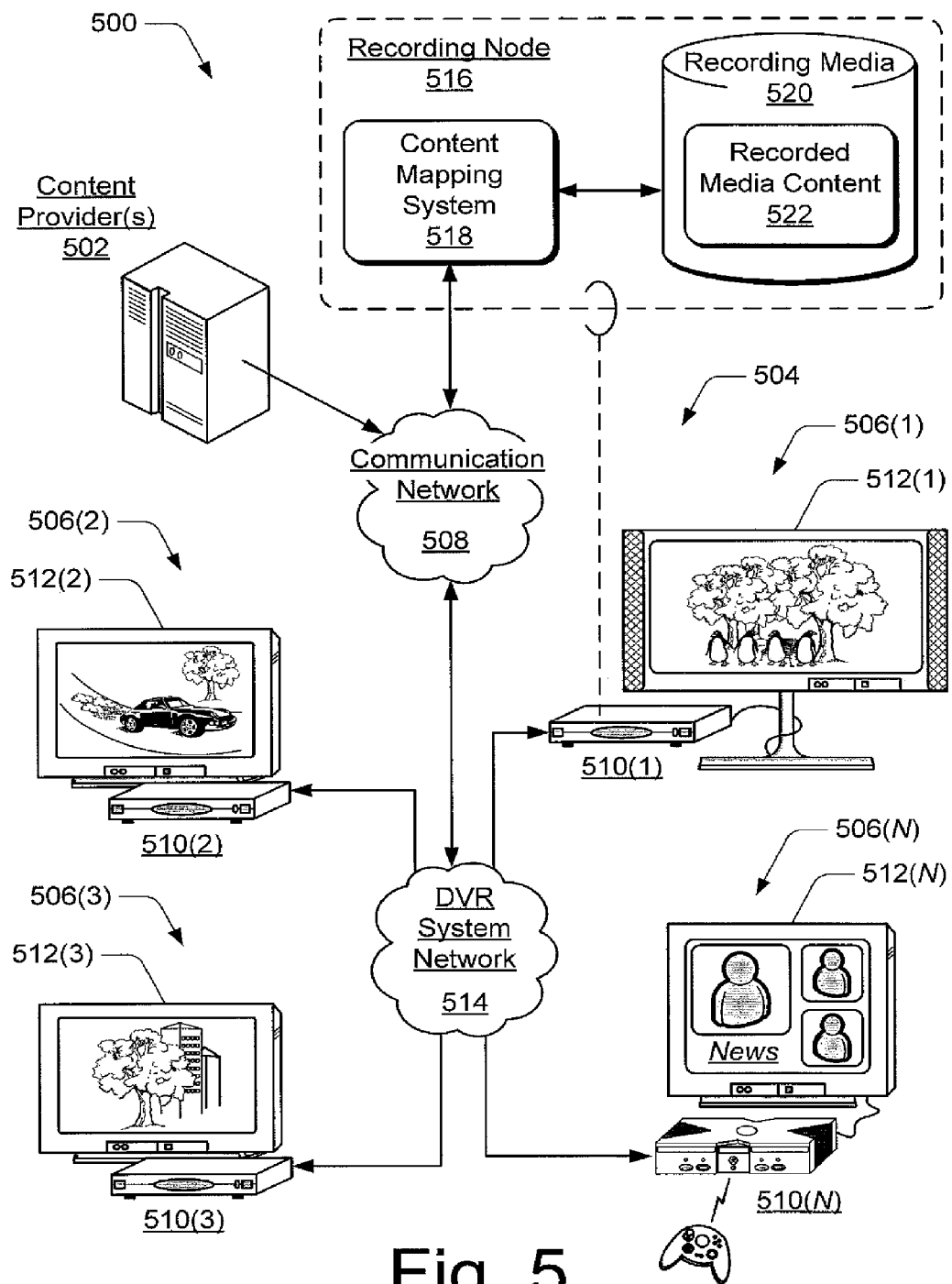
FIG. 5 illustrates an example IP-based television (IPTV) system in which embodiments of multi-DVR media content arbitration can be implemented.

FIG. 5 illustrates an example IP-based television (IPTV) environment 500 in which embodiments of multi-DVR media content arbitration can be implemented. The IPTV environment 500 includes content provider(s) 502 and a multi-DVR system 504 that can include any number of client systems 506(1-N). The multi-DVR system 504 is an example of the multi-DVR system shown in FIG. 1, and can represent a household viewing system that has several viewing areas, such as different rooms, for viewing television programs. The multi-DVR system 504 is configured for communication with any number of the different content provider(s) 502 via a communication network 508 which, in this example, is an IP-based network. Any of the systems and/or devices can be configured for network access in any number of embodiments and varieties of implementation.

The client systems 506(1-N) of the multi-DVR system 504 are representative of the DVR nodes 108(1-N) of the multi-DVR system shown in FIG. 1. The client system 506(1) includes a client device 510(1) and a display device 512(1), such as any type of television, monitor, LCD, or similar television-based display system that together renders audio, video, and/or image data. Similarly, the client systems 506(2-N) each include a respective client device 510(2-N) and a respective display device 512(2-N). Each client device 510 can be implemented in any number of embodiments, such as a television system set-top box, a digital video recorder (DVR) and playback system, an appliance device, a gaming system such as client device 510(N), and as any other type of client device that may be implemented in an entertainment and information system.

Each of the client devices 510(1-N) can include an instantiation of the arbitration algorithm 116 described with reference to FIGS. 1 and 4 to implement embodiments of multi-DVR media content arbitration as described herein. The client systems 506(1-N) can be implemented for communication with each other via a DVR system network 514, and may be implemented with any number and combination of differing components as further described below with reference to the example client device shown in FIG. 6. Further, the IPTV environment 500 may be implemented with any number and combination of differing components as described below with reference to the example entertainment and information system shown in FIG. 7.

A client system 506 at a node of the multi-DVR system 504 can receive programs, associated program content, various forms of media content, program guide data, advertising content, and other types of media content from content server(s) of the content provider(s) 502 via the communication network 508. Media content can include television programs (or programming) which may be any form of programs, commercials, music, movies, and video on-demand movies. Other media content can include recorded media content, interactive games, network-based applications, and any other similar audio, video, and/or image content. In addition, media content in general may include music streamed from a computing device to a client device, such as a television system set-top box, and may also include video on-demand media content delivered from a server, a photo slideshow, and any other audio, video, and/or image content received from any type of media content source.

Although the data streams are not shown specifically, the arrowed communication links illustrate various data communication links which include the data streams. Additionally, the arrowed communication links are not intended to be interpreted as a one-way communication link from the DVR system network 514 to a client device 510(1), for example. It is contemplated that any one or more of the arrowed communication links can facilitate two-way data communication, such as from communication network 508 to a content provider 502.

The multi-DVR system 504 includes a recording node 516 which includes a content mapping system 518 and recording media 520 to maintain recorded media 522. In an embodiment, any one or more of the client devices 510(1-N) in the multi-DVR system 504 can be implemented as the recording node 516 (as shown by the dashed line) which includes the recording media 520 to record media content received from a content provider 502. Alternatively (or in addition), a recording node of the multi-DVR system 504 can be implemented as a network-based recording node that the multi-DVR system 504 communicates with via the communication network 508. In another implementation, the recording node 516 can be an independent component of the multi-DVR system 504.

The recording node 516 can record media content with the recording media 520 for any one or more of the client devices 510(1-N) of the multi-DVR system 504. For example, a client device 510 at a node of the multi-DVR system 504 can initiate a record request to have media content recorded for a scheduled recording or to record and provide a pause buffer for the client device. The recording node 516 can receive the record request and record the media content such that the client device can access and render the recorded media content from the recording node via the DVR system network 514 and/or the communication network 508.

Figure 6:
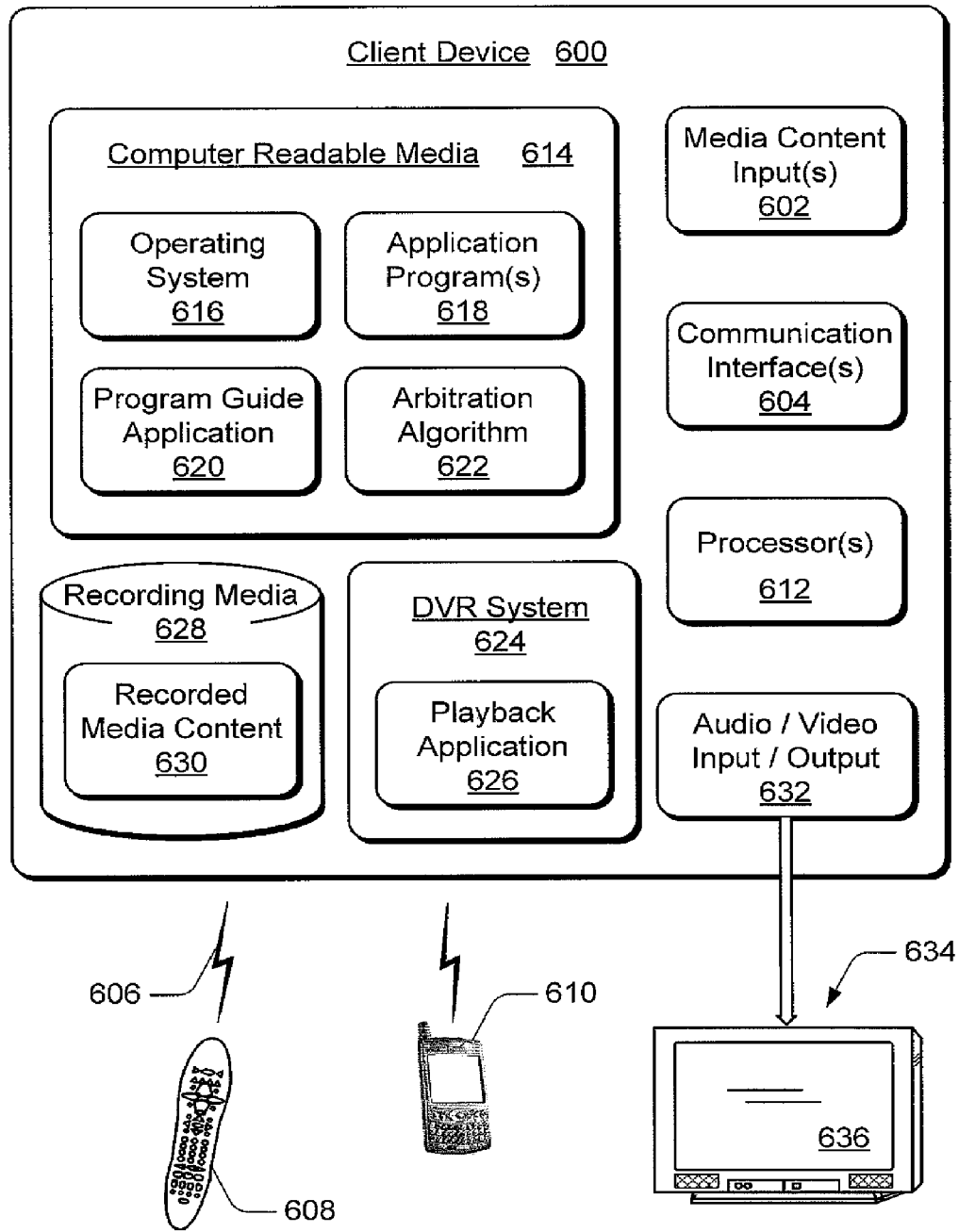
FIG. 6 illustrates various components of an example client device in which embodiments of multi-DVR media content arbitration can be implemented.

FIG. 6 illustrates various components of an example client device 600 which can be implemented as any form of a computing, electronic, or television system client device in which embodiments of multi-DVR media content arbitration can be implemented. For example, the client device 600 can be implemented as a client device at a DVR node of the multi-DVR system shown in FIG. 1, and/or as any one of the client devices 510(1-N) shown in FIG. 5 as part of the multi-DVR system 504.

Client device 600 includes one or more media content inputs 602 which may include Internet Protocol (IP) inputs over which streams of media content are received via an IP-based network. Device 600 further includes communication interface(s) 604 which can be implemented as any one or more of a serial and/or parallel interface, a wireless interface, any type of network interface, a modem, and as any other type of communication interface. A wireless interface enables client device 600 to receive control input commands 606 and other information from an input device, such as from remote control device 608, a portable computing-based device (such as a cellular phone) 610, or from another infrared (IR), 802.11, Bluetooth, or similar RF input device.

A network interface provides a connection between the client device 600 and a communication network by which other electronic and computing devices can communicate data with device 600. Similarly, a serial and/or parallel interface provides for data communication directly between client device 600 and the other electronic or computing devices. A modem facilitates client device 600 communication with other electronic and computing devices via a conventional telephone line, a DSL connection, cable, and/or other type of connection.

Client device 600 also includes one or more processors 612 (e.g., any of microprocessors, controllers, and the like) which process various computer executable instructions to control the operation of device 600, to communicate with other electronic and computing devices, and to implement embodiments of multi-DVR media content arbitration. Client device 600 can be implemented with computer readable media 614, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer readable media 614 provides data storage mechanisms to store various information and/or data such as software applications and any other types of information and data related to operational aspects of client device 600. For example, an operating system 616 and/or other application programs 618 can be maintained as software applications with the computer readable media 614 and executed on processor(s) 612 to implement embodiments of multi-DVR media content arbitration.

For example, client device 600 can be implemented to include a program guide application 620 that is implemented to process program guide data and generate program guides for display which enable a viewer to navigate through an onscreen display and locate broadcast programs, recorded programs, video on-demand programs and movies, interactive game selections, network-based applications, and other media access information or content of interest to the viewer. The client device 600 can also be implemented to include an arbitration algorithm 622 to implement embodiments of multi-DVR media content arbitration as described herein.

The client device 600 can also include a DVR system 624 with playback application 626, and recording media 628 to maintain recorded media content 630 which may be any form of on-demand and/or media content such as programs, movies, commercials, music, and similar audio, video, and/or image content that client device 600 receives and/or records. Further, client device 600 may access or receive additional recorded media content that is maintained with a remote data store (not shown), such as from a video-on-demand server, or media content that is maintained at a broadcast center or content provider that distributes the media content to subscriber sites and client devices. The playback application 626 is a video control application that can be implemented to control the playback of media content, the recorded media content 630, and or other video on-demand media content, music, and any other audio, video, and/or image media content which can be rendered and/or displayed for viewing.

The client device 600 also includes an audio and/or video output 632 that provides audio and video to an audio rendering and/or display system 634, or to other devices that process, display, and/or otherwise render audio, video, and image data. Video signals and audio signals can be communicated from device 600 to a display device 636 via an RF (radio frequency) link, S-video link, composite video link, component video link, analog audio connection, or other similar communication link. Alternatively, the audio rendering and/or display system 634 can be implemented as integrated components of the example client device 600.

Figure 7:
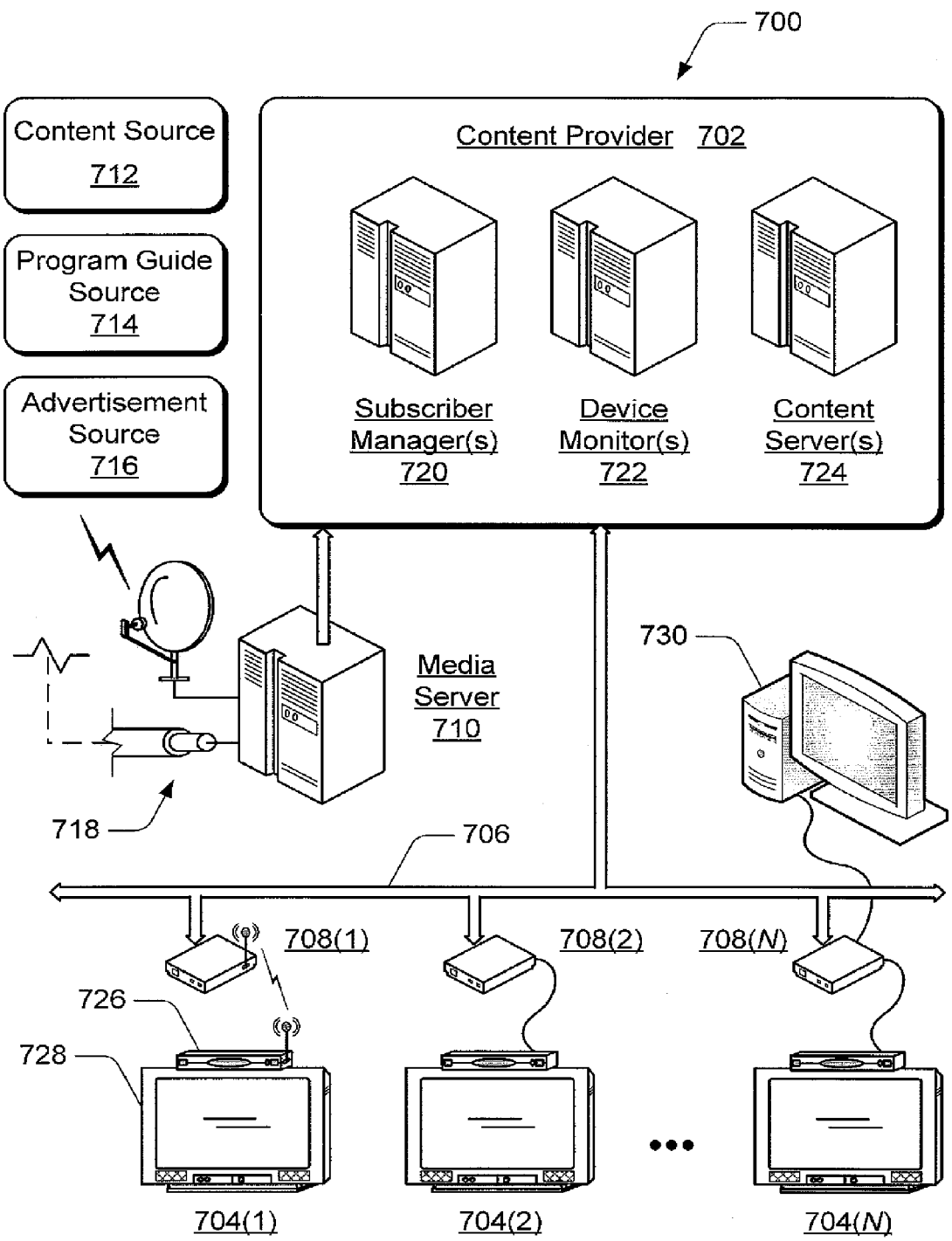
FIG. 7 illustrates various devices and components in an example entertainment and information system in which embodiments of multi-DVR media content arbitration can be implemented.

FIG. 7 illustrates an example entertainment and information system 700 in which an IP-based television environment can be implemented, and in which embodiments of multi-DVR media content arbitration can be implemented. System 700 facilitates the distribution of media content, program guide data, and advertising content to multiple viewers and to multiple viewing systems. System 700 includes a content provider 702 and client systems 704(1-N) each configured for communication via an IP-based network 706. Each client system 704(1-N) is an example of the client systems 506(1-N) described with reference to FIG. 5. Each of the client systems 704(1-N) can receive one or more data streams from content provider 702 which are then distributed to one or more other client devices at DVR nodes of a multi-DVR system.

The network 706 can be implemented as a wide area network (e.g., the Internet), an intranet, a Digital Subscriber Line (DSL) network infrastructure, or as a point-to-point coupling infrastructure. Additionally, network 706 can be implemented using any type of network topology and any network communication protocol, and can be represented or otherwise implemented as a combination of two or more networks. A digital network can include various hardwired and/or wireless links 708(1-N), routers, gateways, and so on to facilitate communication between content provider 702 and the client systems 704(1-N). The client systems 704(1-N) receive media content, program content, program guide data, advertising content, closed captions data, and the like from content server(s) of the content provider 702 via the IP-based network 706.

System 700 includes a media server 710 that receives media content from a content source 712, program guide data from a program guide source 714, and advertising content from an advertisement source 716. In an embodiment, the media server 710 represents an acquisition server that receives the audio and video media content from content source 712, an EPG server that receives the program guide data from program guide source 714, and/or an advertising management server that receives the advertising content from the advertisement source 716.

The content source 712, the program guide source 714, and the advertisement source 716 control distribution of the media content, the program guide data, and the advertising content to the media server 710 and/or to other servers. The media content, program guide data, and advertising content is distributed via various transmission media 718, such as satellite transmission, radio frequency transmission, cable transmission, and/or via any number of other wired or wireless transmission media. In this example, media server 710 is shown as an independent component of system 700 that communicates the program content, program guide data, and advertising content to content provider 702. In an alternate implementation, media server 710 can be implemented as a component of content provider 702.

Content provider 702 is representative of a headend service in a content distribution system, for example, that provides the media content, program guide data, and advertising content to multiple subscribers (e.g., the client systems 704(1-N)). The content provider 702 can be implemented as a satellite operator, a network television operator, a cable operator, and the like to control distribution of media content, program and advertising content, such as movies, television programs, commercials, music, and other audio, video, and/or image content to the client systems 704(1-N).

Content provider 702 includes various components to facilitate media data processing and content distribution, such as a subscriber manager 720, a device monitor 722, and a content server 724. The subscriber manager 720 manages subscriber data, and the device monitor 722 monitors the client systems 704(1-N) (e.g., and the subscribers), and maintains monitored client state information.

Although the various managers, servers, and monitors of content provider 702 (to include the media server 710 in one embodiment) are illustrated and described as distributed, independent components of content provider 702, any one or more of the managers, servers, and monitors can be implemented together as a multi-functional component of content provider 702. Additionally, any one or more of the managers, servers, and monitors described with reference to system 700 can implement features and embodiments of multi-DVR media content arbitration.

The client systems 704(1-N) can be implemented to include a client device 726 and a display device 728 (e.g., a television, LCD, and the like). A client device 726 of a client system 704 can be implemented in any number of embodiments, such as a set-top box, a digital video recorder (DVR) and playback system, an appliance device, a gaming system, and as any other type of client device that may be implemented in an entertainment and information system. In an alternate embodiment, client system 704(N) is implemented with a computing device 730 as well as a client device 726. Additionally, any of the client devices 726 of a client system 704 can implement features and embodiments of multi-DVR media content arbitration as described herein.

Although embodiments of multi-DVR media content arbitration have been described in language specific to features and/or methods, it is to be understood that the subject of the appended claims is not necessarily limited to the specific features or methods described. Rather, the specific features and methods are disclosed as example implementations of multi-DVR media content arbitration.

The invention claimed is:

1. A multi-DVR (digital video recorder) system comprising:
    client devices that are each a node of the multi-DVR system and configured for communication with each other;
    one or more processors at individual client devices of the client devices to execute an arbitration algorithm configured to arbitrate media content being rendered by the client devices so as not to exceed a media content usage capacity of the multi-DVR system;
    the individual client devices configured to:
        communicate status messages directly to the client devices to indicate media content being rendered and receive the status messages directly from the client devices;
        implement the arbitration algorithm to:
            prioritize the media content being rendered by the client devices based at least in part on:
                a type of the media content;
                an indication of a viewer action associated with the media content being rendered; and
                a recency of a media content tune, wherein the recency of the media content tune is determined based on time durations since the client devices have received the indication of the viewer action associated with the media content being rendered; and
            based at least in part on prioritizing the media content, determine which of the client devices is rendering a lowest priority media content that can be terminated to provide capacity for rendering higher priority media content at another of the client devices of the multi-DVR system; and
        terminate, by a first client device of the client devices, the lowest priority media content based at least in part on determining that the first client device is rendering the lowest priority media content and terminate the lowest priority media content on behalf of a second client device of the client devices based at least in part on determining that the second client device is rendering the lowest priority media content.

2. A multi-DVR system as recited in claim 1, wherein the individual client devices implement the arbitration algorithm to independently determine whether a same client device of the client devices is rendering the lowest priority media content.

3. A multi-DVR system as recited in claim 1, wherein the arbitration algorithm is further configured to arbitrate the media content being rendered by the client devices so as not to exceed a bandwidth capacity of the multi-DVR system.

4. A multi-DVR system as recited in claim 1, wherein the arbitration algorithm is further configured to arbitrate the media content being rendered by the client devices so as not to exceed a maximum number of media content streams in the multi DVR system.

5. A multi-DVR system as recited in claim 1, wherein prioritizing the media content being rendered by the client devices is based at least in part on the recency of the media content tune comprises prioritizing a more recent media content being tuned at a particular client device of the client devices over a previous media content being tuned at a different client device of the client devices.

6. The method of claim 1, wherein prioritizing the media content being rendered by the client devices based at least in part on the indication of the viewer action associated with the media content currently being rendered comprises:
    calculating, for the media content being rendered by the individual client devices, time durations since the individual client devices have received the indication of the viewer action associated with the media content being rendered, the viewer action indicating that a viewer is watching the rendered media content; and
    based at least on the time durations calculated with respect to the individual client devices, designating the media content having a largest time duration as the lowest priority media content.

7. A multi-DVR system as recited in claim 6, wherein the indication that the viewer is watching the media content is associated with a remote control input.

8. A multi-DVR system as recited in claim 1, wherein the type of the media content comprises one of:
    recorded media content,
    on demand media content,
    live media content, and
    picture in picture media content.

9. A method at a client device, the method comprising:
    communicating a status message directly to a plurality of client devices that are each a node of a multi-DVR (digital video recorder) system, the status message identifying rendered media content stored at the client device, a type of the rendered media content stored at the client device, an indication of a viewer action associated with the rendered media content stored at the client device, and a recency of a media content tune at the client device, wherein the recency of the media content tune is determined based on a time duration since the client device has received the indication of the viewer action associated with the rendered media content;
    receiving additional status messages directly from individual client devices of the plurality of client devices, the additional status messages identifying the rendered media content stored at the individual client devices;
    prioritizing the rendered media content stored at the individual client devices based at least in part on the status message;
    based at least in part on the prioritizing, determining from the additional status messages which of the individual client devices is storing a lowest priority stored media content that can be deleted to provide storage capacity for higher priority media content at another of the individual client devices of the multi-DVR system; and
    deleting the lowest priority stored media content based at least in part on determining that the client device is storing the lowest priority stored media content and deleting the lowest priority stored media content on behalf of a different client device of the plurality of client devices based at least in part on determining that the different client device is storing the lowest priority stored media content.

10. A method as recited in claim 9, further comprising:
    determining that the client device is storing the lowest priority stored media content; and based at least in part on the determining that the client device is storing the lowest priority stored media content, deleting the rendered media content stored at the client device.

11. A method as recited in claim 9, further comprising executing an arbitration algorithm to determine which of the individual client devices is storing the lowest priority stored media content that can be deleted.

12. A method as recited in claim 11, wherein the individual client devices execute the arbitration algorithm to independently determine that a same client device of the plurality of client devices is storing the lowest priority stored media content that can be deleted.

13. A method as recited in claim 9, further comprising arbitrating the rendered media content stored by the individual client devices so as not to exceed a bandwidth capacity of the multi-DVR system.

14. A method as recited in claim 9, further comprising arbitrating the rendered media content stored by the individual client devices so as not to exceed a maximum number of media content streams in the multi DVR system.

15. A method as recited in claim 9, wherein prioritizing the rendered media content stored at the individual client devices based at least in part on the status message and the additional status messages comprises prioritizing a stored media content being tuned more recently at a first client device of the plurality of client devices over a previously tuned stored media content at a second client device of the plurality of client devices to determine which of the individual client devices has the lowest priority stored media content that can be deleted.

16. A device comprising;
   a processor; and
   an arbitration algorithm that, when executed by the processor, directs a particular client device of a plurality of client devices to:
      arbitrate media content stored by the plurality of client devices of a multi-DVR (digital video recorder) system so as not to exceed a media content storage capacity of the multi DVR system, individual client devices of the plurality of client devices being configured to communicate directly with one another;
      prioritize the media content stored by the individual client devices based at least in part on a type of the media content, an indication of a viewer action associated with the media content, and a recency of a media content tune, wherein the recency of the media content tune is determined based on time durations since the individual client devices have received the indication of the viewer action associated with the media content;
      determine which of the individual client devices has a lowest priority stored media content that can be deleted to provide capacity for higher priority media content at another one of the individual client devices; and
      delete the lowest priority stored media content based at least in part on determining that the particular client device is storing the lowest priority stored media content and delete the lowest priority stored media content on behalf of a an individual client device of the individual client devices based at least in part on determining that the second client device is storing the lowest priority stored media content.

17. The device as recited in claim 16, wherein determining which of the individual client devices has the lowest priority stored media content comprises:
   calculating, for individual media content items of the media content stored by the individual client devices, a time duration that corresponds to an amount of time that has expired since the individual client devices have received a viewer action associated with the individual media content items; and
   based at least on the time durations for the individual media content items, designating a particular individual media content item of the individual media content items having a largest time duration as the lowest priority stored media content.

18. The device as recited in claim 16, wherein the arbitration algorithm is further executable to direct the particular client device to arbitrate the media content rendered by the plurality of client devices so as not to exceed a bandwidth capacity of the multi-DVR system.

19. The device as recited in claim 16, wherein the arbitration algorithm is further executable to direct the particular client device to arbitrate the media content rendered by the plurality of client devices so as not to exceed a maximum number of media content streams in the multi DVR system.

20. The device as recited in claim 16, wherein:
   the arbitration algorithm is further executable to direct the particular client device to receive status messages directly from the individual client devices, the status messages indicating media content being rendered at the individual client devices; and
   the media content rendered by the individual client devices is arbitrated independently by the independent client devices based on the received status messages.

* * * * *